United States Patent [19]
Whysong

[11] Patent Number: 4,821,819
[45] Date of Patent: Apr. 18, 1989

[54] ANNULAR SHIM FOR CONSTRUCTION BIT HAVING MULTIPLE PERFORATIONS FOR STRESS RELIEF

[75] Inventor: Hubert H. Whysong, Imler, Pa.

[73] Assignee: Kennametal Inc., Latrobe, Pa.

[21] Appl. No.: 84,607

[22] Filed: Aug. 11, 1987

[51] Int. Cl.⁴ ............................................. E21B 10/52
[52] U.S. Cl. ..................................... 175/410; 299/91; 228/122; 228/263.12
[58] Field of Search .......................... 175/410; 299/91; 228/122, 132, 133, 188, 263.12

[56] References Cited

U.S. PATENT DOCUMENTS

| | | | |
|---|---|---|---|
| 1,956,233 | 4/1934 | Braun | 29/95 |
| 3,294,186 | 12/1966 | Buell | 175/410 |
| 4,251,018 | 2/1981 | Funk | 228/188 X |
| 4,330,044 | 5/1982 | Orr et al. | 175/410 |
| 4,356,873 | 11/1982 | Dziak | 175/410 |
| 4,668,118 | 5/1987 | Bucher et al. | 403/272 |

FOREIGN PATENT DOCUMENTS

| | | | |
|---|---|---|---|
| 0028706 | 12/1956 | Fed. Rep. of Germany | |
| 0227635 | 9/1941 | Switzerland | 79/6 |
| 0386909 | 6/1933 | United Kingdom | |
| 0664983 | 1/1952 | United Kingdom | |
| 0668810 | 3/1952 | United Kingdom | |

Primary Examiner—William P. Neuder
Attorney, Agent, or Firm—Thomas R. Trempus

[57] ABSTRACT

Formation of a continuous double sandwich braze joint between a bit body of a conical bit and a carbide insert tip disposed in a cylindrical recess formed in a forward end of the bit body is facilitated by a cylindrical shim. In one form, the shim is a cylindrical sleeve having an annular sidewall with opposite forward and rearward open ends. The insert tip is received through the forward open end of the sleeve. Also, a multiplicity of perforations are defined in spaced apart relation through the sidewall and uniformly distributed thereabout. The multi-perforated sleeve is disposed within the bit body recess and between its interior and the exterior of a cylindrical base of the insert tip such that the multiplicity of perforations defined in the sleeve sidewall provide a multiplicity of spaces extending between the bit body and insert tip for receiving braze therethrough. In an alternative form, the shim is a cylindrical basket having a sidewall and endwall. The sidewall is open at its forward end and closed at its rearward end by the endwall. The basket also has a multiplicity of perforations defined through and distributed uniformly about its sidewall and endwall. The endwall is frusto-conical shaped and protrudes away from the sidewall rearward end.

6 Claims, 2 Drawing Sheets

ANNULAR SHIM FOR CONSTRUCTION BIT HAVING MULTIPLE PERFORATIONS FOR STRESS RELIEF

CROSS REFERENCE TO RELATED APPLICATIONS

Reference is hereby made to the following copending U.S. patent applications dealing with related subject matter and assigned to the assignee of the present invention:

1. "Butterfly-Type Shim Having Semi-Opened Bottom And Double Sandwich Braze Joint Produced Therewith" by Mark S. Greenfield et al, assigned U.S. Ser. No. 024,945 and filed Mar. 12, 1987. (K-0842)

2. "Butterfly-Type Shim Having Perforations In Mid-Section Thereof And Double Sandwich Braze Joint Produced Therewith" by Hubert H. Whysong, assigned U.S. Ser. No. 071,084,581 and filed Aug. 11, 1987. (K-0880)

BACKGROUND OF THE INVENTION

1. Field of the Invention

The present invention generally relates to mining and construction tools and, more particularly, is concerned with an annular or cylindrical shim with multiple perforations for joining a conical carbide tip to the body of a conical bit useful in coal mining.

2. Description of the Prior Art

Considering that thermal expansion rates of hard carbide and tungsten alloys very from one-third to one-half that of steel, over the years brazing has proven to be an extremely successful and advantageous method of mounting carbides to steel. While it is most satisfactory when applied to small-area, short-length joints, it can also be satisfactorily applied to larger joints. However, whereas small joints are produced by relative simple, straightforward construction methods, large joints normally require more complicated methods to avoid difficulties which would otherwise be encountered in construction of the large joints.

These difficulties stem from the amount of thermal or brazing strain (or stress) created in the joined parts during formation of the braze joint. The amount of brazing strain created in small areas or short lengths of parts as a braze joint between them solidifies is usually minor and normally absorbed without materially weakening the joined parts. On longer parts or larger areas, however, the brazing strain becomes proportionately greater and can lead to considerable bending and frequently to fracture of the carbide part. Thus, other methods of construction have been used heretofore to relieve brazing strains induced in carbide and steel parts by these longer or larger braze joints.

One method of construction to relieve brazing strain is to use a sandwich braze joint composed of a shim of a malleable metal, such as copper, between the carbide and steel parts. The malleable metal shim does not melt during brazing of the joint will deform under the brazing strain without losing its bond to the steel or carbide parts, thus relieving the stress or strain to a large degree. Representative examples of prior art shims include those disclosed in U.S. Pats. Nos. to Braun (1,956,233), Orr et al (4,330,004) and Dziak (4,356,873); Swiss Pat. No. to Braun (227,635); German Pat. Application No. to Hasewend (B 28706Ib/49h); and British Pats. Nos. 386,909, 664,983 and 668,810.

In conical bits which utilize conical carbide tips, heretofore a cylindrical recess has normally been provided in the forward end of the bit body in which the conical tip is seated and brazed to the bit body at the sidewall of the recess. This approach has been satisfactory historically for relatively small diameter carbide tips. However, carbide tips are currently being provided in larger diameter sizes. As their diameter increases, the size of the recess in the bit body must also increase leaving less metal at the forward end of the bit surrounding the tip to absorb the stresses arising in the metal during formation of the braze joint.

Some alternative technique must be devised to reduce the formation of stress in the case of conical bits using larger diameter conical carbide tips. However, none of the above-cited patents appear to disclose an optimum alternative approach. Consequently, a need exists for an alternative technique to produce a more effective braze joint between the conical bit body and carbide tip so as to provide a more durable tool having an increased useful life.

SUMMARY OF THE INVENTION

The present invention provides an annular shim which facilitates reliable formation of a braze joint designed to satisfy the aforementioned needs. The shim of the present invention is either in the form of a cylindrical sleeve open at its opposite ends or a cylindrical basket open at one and closed at the other. In either form, the shim has an array of spaced apart perforations defined therein and uniformly distributed across it so as to provide a multi-perforated structure between the exterior of a cylindrical base of the insert tip and interior of a cylindrical recess in the forward end of the bit body which accommodates greater amounts of braze and relieves stresses produced in the joint by the brazing operation.

Accordingly, the present invention is directed to a shim for facilitating formation of a double sandwich braze joint. The shim comprises: (a) an annular sidewall with opposite forward and rearward ends and being open at least at its forward end for receiving an insert tip; and (b) means defining a multiplicity of perforations in spaced apart relation through the sidewall. The perforations are distributed uniformly about the sidewall and between the ends thereof.

In one form, the shim sidewall is defined by a cylindrical sleeve and is also open at the rearward end of the sidewall. The sleeve can be formed such that its sidewall is discontinuous. In another form, the shim is a cylindrical basket having an annular sidewall with opposite forward and rearward ends and a bottom wall extending across and connecting the sidewall at the rearward end thereof. The basket sidewall is open at the forward end for receiving the insert tip. The basket bottom wall is frusto-conical shaped and protrudes away from the rearward end of the sidewall. The perforations are defined through and distributed uniformly about the basket sidewall and bottom wall.

Further, the present invention is directed to the combination of a body of a conical bit, a carbide insert tip and either of the above-defined shims. The conical bit has a cylindrical recess with a cylindrical interior side surface formed in a forward end of the bit body. The carbide insert tip has a cylindrical base with a cylindrical exterior side surface and is sized relative to the recess to fit within the recess in spaced relation to the interior side surface thereof. The cylindrical shim is dispose within the recess between the respective corresponding interior and exterior surfaces of the bit body and insert tip for facilitating formation of the continuous double sandwich braze joint between the bit body, insert tip and shim. The multiplicity of perforations defined in the shim provide a multiplicity of spaces extending between the bit body and insert tip for receiving braze therethrough and relieving stresses across the joint.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
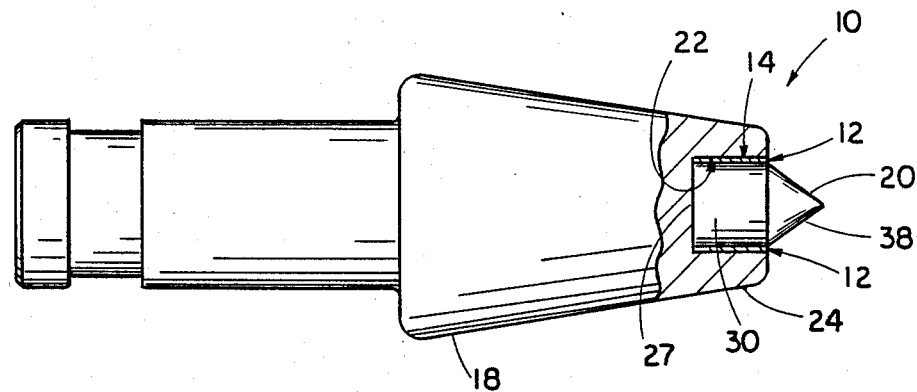
FIG. 1 is a side elevational view of a conical mining bit partially broken away and sectioned to show a continuous double sandwich braze joint constructed in the bit in accordance with the principles of the present invention between the bit body, a carbide insert tip and a shim of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Figure 3:
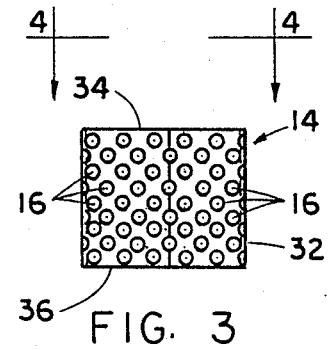
FIG. 3 is a side elevational view of the shim of the present invention by itself.
Figure 4:
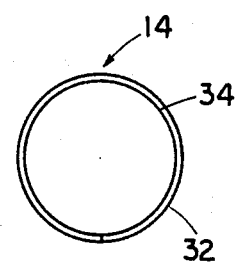
FIG. 4 is a top plan view of the shim as seen along line 4—4 of FIG. 3.
Figure 5:
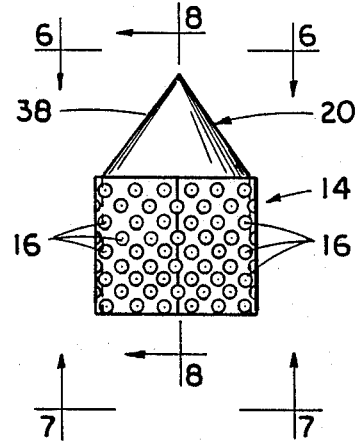
FIG. 5 is a side elevational view of the shim with the carbide insert tip disposed therein.
Figures 6, 7:
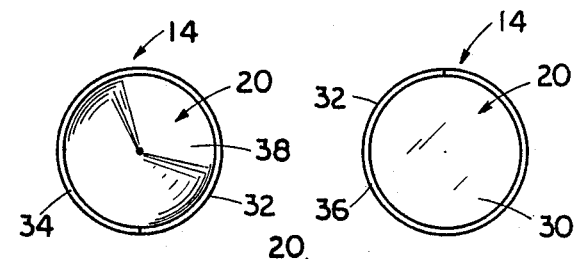
FIG. 6 is a top plan view of the shim and insert tip as seen along line 6—6 of FIG. 5.
FIG. 7 is a bottom plan view of the shim and insert tip as seen along line 7—7 of FIG. 5.
Figure 8:
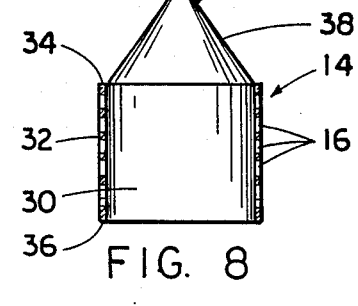
FIG. 8 is a longitudinal axial sectional view of the shim and insert tip taken along line 8—8 of FIG. 5.
Figure 11:
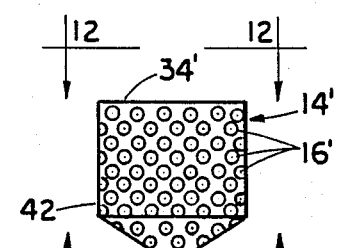
FIG. 11 is a side elevational view of the shim of the present invention by itself.
Figure 12:
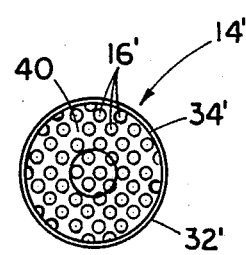
FIG. 12 is a top plan view of the shim as seen along line 12—12 of FIG. 11.
Figure 14:
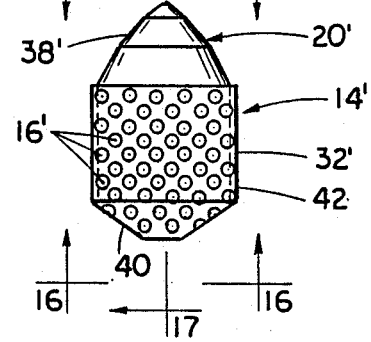
FIG. 14 is a side elevational view of the shim with the carbide insert tip disposed therein.
Figure 13:
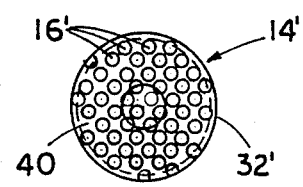
FIG. 13 is a bottom plan view of the shim as seen along line 13—13 of FIG. 11.
Figure 15:
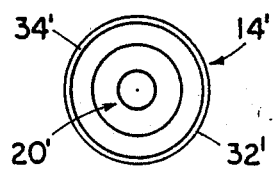
FIG. 15 is a top plan view of the shim and insert tip as seen along line 15—15 of FIG. 14.
Figure 16:
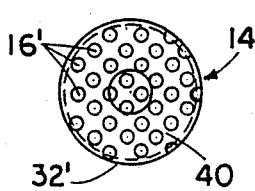
FIG. 16 is a bottom plan view of the shim and insert tip as seen along line 16—16 of FIG. 14.
Figure 17:
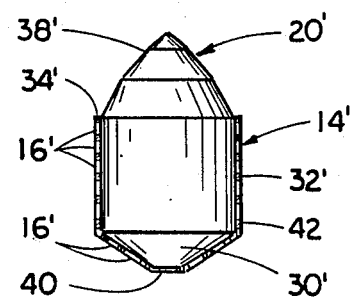
FIG. 17 is a longitudinal axial sectional view of the shim and insert tip taken along line 17—17 of FIG. 14.

Referring now to the drawings, and particularly to FIG. 1, there is shown a conical bit, generally designated by the numeral 10, which employs a continuous double sandwich braze joint 12 constructed in accordance with the principles of the present invention, using an annular or cylindrical shim 14 having a multiplicity of perforations 16 formed therethrough in spaced apart relation, as can be readily seen in FIGS. 3 and 5 in a first form of the shim and in FIGS. 11-13 in a second form of the shim. The conical bit 10 is particularly useful in coal mining applications.

More particularly, the double sandwich braze joint 12 is formed between a body 18 of the conical bit 10, for example, being composed of steel, and a hard carbide insert tip 20 disposed in a cylindrical recess 22 formed in a forward end 24 of the bit body 18. The multiperforated cylindrical shim 14 is placed within the recess 22 and interposed between the interior cylindrical surface 26 (and against an interior flat bottom surface 27) in the bit body 20 defining the recess 22 and the adjacent exterior cylindrical surface 28 on a base portion 30 of the insert tip 22. The multiplicity of uniformly-distributed perforations 16 defined in the shim 14 provide a multiplicity of uniformly-distributed spaces extending through the shim 14 between the interior of the bit body 18 and the exterior of the insert tip 20 for receiving braze therethrough and relieving stresses produced by the brazing operation across the joint 12. It should also be pointed out here that the perforations 16 themselves also relieve stresses. Basically, the bit body 18 and carbide insert tip 20 per se the conventional, whereas the shim 14 and the construction of the double sandwich braze joint 12 by use of the shim 14 with the conventional bit body 18 and insert tip 20 comprise the present invention.

Figure 2:
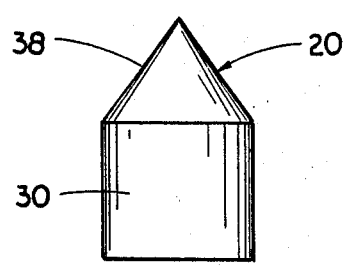
FIG. 2 is a side elevational view of the carbide insert tip by itself.

The shim 14 is illustrated in two slightly different forms. In one form shown in FIGS. 3-8 being associated with one version of the insert tip 20 seen in FIG. 2, the shim 14 is a cylindrical sleeve having an annular sidewall 32 with opposite forward and rearward open ends 34,36. The insert tip 20 at its cylindrical base portion 30 is received through the forward open end 34 of the sleeve sidewall 32. A conical working tip portion 38 of the insert tip 20 extends forwardly from the bit body 18. The multiplicity of perforations 16 are defined in spaced apart relation through the sidewall 32 and uniformly distributed thereabout and between the forward and rearward ends 34,36 thereof.

Figure 9:
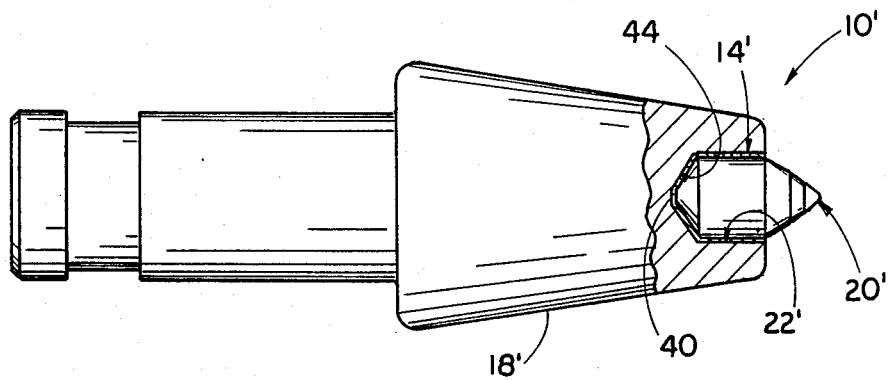
FIG. 9 is a side elevational view of another conical mining bit partially broken away and sectioned to show a continuous double sandwich braze joint constructed in the bit in accordance with the principles of the present invention between the bit body, a carbide insert tip and an alternative shim of the present invention.
Figure 10:
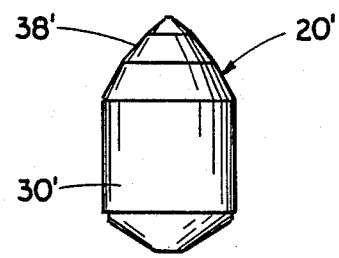
FIG. 10 is a side elevational view of the carbide insert tip by itself.

In an alternative form illustrated in FIGS. 11-17 being associated with another version of the insert tip seen in FIG. 10, the shim 14' is a cylindrical basket having a sidewall 32' and an endwall 40. The sidewall 32' is open at its forward end 34' and closed at its rearward end 42 by the endwall 40. The basket-type shim 14' also has a multiplicity of perforations 16' defined through and distributed uniformly about its sidewall 32' and endwall 40. The endwall 40 is preferably frustoconical shaped and protrudes away from the sidewall rearward end 42. The endwall 40 is thus shaped to receive a similarly shaped base portion 30' of the insert tip 20' and, in turn, to itself seat in a similarly shaped bottom seat portion 44 of the recess 22' in the body 18 of the slightly modified bit 10', as shown in FIG. 9.

In forming the braze joint 12, a piece of braze alloy (not shown) will be placed in the recess 22 (or 22') under the shim 14 (or 14') with the insert tip 20 placed in the shim. The assembly is then induction heated, causing the braze to flow up the sidewall of the shim 14 by capillary action.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A shim for facilitating formation of a double sandwich braze joint, said shim comprising:
   (a) a cylindrical basket having an annular sidewall with opposite forward and rearward ends and a bottom wall extending across and connecting said sidewall at said rearward end thereof, said bottom wall being frusto-conical in shape and protruding away from said rearward end of said sidewall, said sidewall being open at said forward end for receiving an insert tip; and
   (b) means defining a multiplicity of perforations in spaced apart relation through said sidewall and bottom wall of said basket, said perforations being distributed about said sidewall and endwall.

2. The shim as recited in claim 1, wherein said perforations are distributed uniformly about said basket sidewall and bottom wall.

3. In combination with a bit body of a conical bit having a cylindrical recess with a cylindrical interior side surface formed in a forward end of said bit body and a carbide insert tip having a cylindrical base with a cylindrical exterior side surface and being sized relative to said recess to fit within said recess in spaced relation to said interior side surface thereof, a cylindrical shim being disposed within said recess between said respective corresponding interior and exterior surfaces of said bit body and insert tip for facilitating formation of a continuous double sandwich braze joint between said bit body, insert tip and shim, said shim comprising:
   (a) an annular sidewall having opposite forward and rearward ends and being open at least at said forward end for receiving the insert tip therethrough; and
   (b) an endwall extending across and connected with said sidewall at said rearward end thereof, said endwall being frusto-conical in shape and protruding away from said rearward end of said sidewall; and
   (c) means defining a multiplicity of perforations in spaced apart relation through said sidewall, said perforations being distributed about said sidewall and between said ends thereof;
   (d) said sidewall being disposed within said recess of said bit body between said respective corresponding interior and exterior surfaces of said bit body and insert tip such that said multiplicity of perforations defined in said sidewall provide a multiplicity of spaces extending between said bit body and insert tip for receiving braze therethrough.

4. The shim as recited in claim 3, wherein said perforations are distributed uniformly about said sidewall.

5. The shim as recited in claim 3, wherein said sidewall is discontinuous.

6. The shim as recited in claim 3, wherein said perforations are defined through and distributed uniformly about said endwall.

* * * * *